United States Patent
Haller et al.

(10) Patent No.: US 9,266,453 B2
(45) Date of Patent: Feb. 23, 2016

(54) VEHICLE VIBRATION MEANS, VEHICLE SEAT OR PASSENGER CELL OR VEHICLE

(75) Inventors: Erwin Haller, Birgland (DE); Jens Kolb, Koenigstein (DE)

(73) Assignee: Grammer AG, Amberg (DE)

(*) Notice: Subject to any disclaimer, the term of this patent is extended or adjusted under 35 U.S.C. 154(b) by 454 days.

(21) Appl. No.: 13/355,795

(22) Filed: Jan. 23, 2012

(65) Prior Publication Data

US 2012/0187615 A1    Jul. 26, 2012

(30) Foreign Application Priority Data

Jan. 26, 2011 (DE) .......................... 10 2011 009 530

(51) Int. Cl.
*B60N 2/52* (2006.01)
*B60N 2/50* (2006.01)
*B60N 2/54* (2006.01)

(52) U.S. Cl.
CPC ............. *B60N 2/527* (2013.01); *B60N 2/502* (2013.01); *B60N 2/508* (2013.01); *B60N 2/509* (2013.01); *B60N 2/525* (2013.01); *B60N 2/544* (2013.01)

(58) Field of Classification Search
USPC ............. 188/300; 267/289, 168, 69, 70, 169, 267/203, 293, 64.12–64.16, 120, 124, 267/131–133, 117
See application file for complete search history.

(56) References Cited

U.S. PATENT DOCUMENTS

| | | | |
|---|---|---|---|
| 1,460,771 A * | 7/1923 | Stoner ........................... | 267/289 |
| 2,118,456 A | 5/1938 | Whedon | |
| 2,953,191 A * | 9/1960 | Brendel ........................ | 248/565 |
| 3,190,592 A * | 6/1965 | Grizzle, Jr. .................... | 248/429 |
| 3,300,203 A | 1/1967 | Carter et al. | |
| 3,704,767 A | 12/1972 | Takagi | |
| 3,706,362 A | 12/1972 | Faure | |
| 3,752,432 A | 8/1973 | Lowe | |
| 4,151,973 A | 5/1979 | Sedlock | |
| 4,213,594 A | 7/1980 | Pietsch et al. | |
| 4,286,765 A | 9/1981 | Delgleize et al. | |
| 4,350,317 A | 9/1982 | Aondetto | |
| 4,351,556 A | 9/1982 | Worringer | |
| 4,408,744 A | 10/1983 | Thompson | |
| 4,451,079 A | 5/1984 | Takahashi | |

(Continued)

FOREIGN PATENT DOCUMENTS

| | | |
|---|---|---|
| CN | 100493951 C | 6/2009 |
| DE | 1 898 307 U | 8/1964 |

(Continued)

OTHER PUBLICATIONS

European Search Report for European Patent Application No. 12 159 863.5, mailed Jul. 10, 2013.

(Continued)

*Primary Examiner* — Melanie Torres Williams
(74) *Attorney, Agent, or Firm* — Lathrop & Gage LLP

(57) ABSTRACT

To refine known vehicle vibration devices, the invention proposes a vehicle vibration device with a horizontal vibration means and with a means to stabilise a horizontal middle position of the horizontal vibration means, in which the horizontal vibration means is arranged horizontally vibratable in the vehicle longitudinal direction and/or in the vehicle width direction, in which the stabilisation means comprises a spring element and in which the stabilisation means is integrated in or on a damper means of a vehicle vibration device.

8 Claims, 3 Drawing Sheets

(56) References Cited

U.S. PATENT DOCUMENTS

Figure 1:
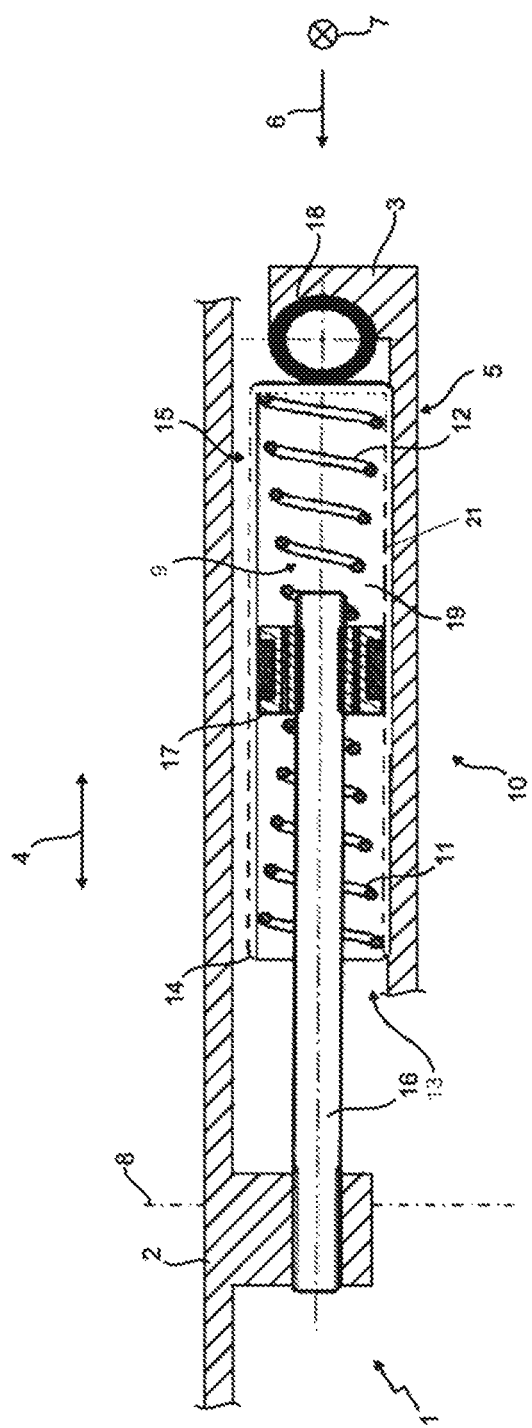

| | | | |
|---|---|---|---|
| 4,477,050 A | 10/1984 | Thompson et al. | |
| 4,573,657 A | 3/1986 | Sakamoto | |
| 4,645,169 A | 2/1987 | Mischer | |
| 4,679,760 A | 7/1987 | Dotzler et al. | |
| 4,684,100 A | 8/1987 | Grassl | |
| 4,729,539 A | 3/1988 | Nagata | |
| 4,773,671 A | 9/1988 | Inagaki | |
| 4,784,434 A | 11/1988 | Iwami | |
| 4,856,763 A | 8/1989 | Brodersen et al. | |
| 4,943,037 A | 7/1990 | Brodersen et al. | |
| 4,961,482 A | 10/1990 | Pohlenz et al. | |
| 4,993,778 A | 2/1991 | Colin et al. | |
| 5,058,852 A | 10/1991 | Meier et al. | |
| 5,125,631 A | 6/1992 | Brodersen et al. | |
| 5,211,369 A | 5/1993 | Hoerner | |
| 5,251,864 A | 10/1993 | Itou | |
| 5,364,060 A | 11/1994 | Donovan et al. | |
| 5,511,868 A * | 4/1996 | Eftefield | 267/289 |
| 5,521,821 A | 5/1996 | Shimizu et al. | |
| 5,533,703 A | 7/1996 | Grassl et al. | |
| 5,553,911 A | 9/1996 | Bodin et al. | |
| 5,582,385 A | 12/1996 | Boyle et al. | |
| 5,735,509 A | 4/1998 | Gryp et al. | |
| 5,765,802 A | 6/1998 | Bostrom et al. | |
| 5,791,738 A | 8/1998 | Niezoldt | |
| 5,794,911 A | 8/1998 | Hill | |
| 5,871,198 A | 2/1999 | Bostrom et al. | |
| 5,957,426 A | 9/1999 | Brodersen | |
| 5,967,604 A | 10/1999 | Yoshida et al. | |
| 5,971,116 A | 10/1999 | Franklin | |
| 6,042,093 A | 3/2000 | Garelick | |
| 6,135,434 A * | 10/2000 | Marking | 267/64.26 |
| 6,340,201 B1 | 1/2002 | Higuchi | |
| 6,478,102 B1 | 11/2002 | Puterbaugh et al. | |
| 6,543,755 B2 | 4/2003 | Monson et al. | |
| 6,616,116 B1 | 9/2003 | Rochau et al. | |
| 6,637,735 B2 | 10/2003 | Monson et al. | |
| 6,745,876 B2 * | 6/2004 | Beck | 188/267.2 |
| 6,763,550 B2 | 7/2004 | Regnier | |
| 6,802,408 B2 | 10/2004 | Krammer | |
| 7,044,553 B2 | 5/2006 | Ropp | |
| 7,152,839 B2 | 12/2006 | Mullinix et al. | |
| 7,168,671 B2 | 1/2007 | Bostrom et al. | |
| 7,185,867 B2 | 3/2007 | Hill et al. | |
| 7,377,533 B2 | 5/2008 | Takeuchi et al. | |
| 7,712,836 B2 | 5/2010 | Deml | |
| 7,810,884 B2 | 10/2010 | Lorey et al. | |
| 7,886,882 B2 | 2/2011 | Behmenburg et al. | |
| 7,942,248 B2 | 5/2011 | St. Clair et al. | |
| 8,118,287 B2 | 2/2012 | Schordine | |
| 8,457,841 B2 | 6/2013 | Knoll et al. | |
| 2001/0035600 A1 | 11/2001 | St. Clair | |
| 2002/0011699 A1 | 1/2002 | St. Clair | |
| 2006/0243548 A1 | 11/2006 | Stein et al. | |
| 2006/0278805 A1 | 12/2006 | Haller | |
| 2007/0278723 A1 | 12/2007 | Shoemaker et al. | |
| 2008/0000738 A1 | 1/2008 | Zdeb | |
| 2008/0000739 A1 | 1/2008 | Behmenburg et al. | |
| 2008/0088165 A1 | 4/2008 | Deml | |
| 2008/0156602 A1 | 7/2008 | Hiemenz et al. | |
| 2008/0197684 A1 | 8/2008 | Ott et al. | |
| 2009/0134595 A1 | 5/2009 | Haller et al. | |
| 2009/0179390 A1 | 7/2009 | Wurmthaler et al. | |
| 2009/0184448 A1 | 7/2009 | Hiser | |
| 2009/0218867 A1 | 9/2009 | Clark | |
| 2009/0256293 A1 | 10/2009 | Ward | |
| 2009/0283944 A1 | 11/2009 | Schordine | |
| 2010/0052356 A1 | 3/2010 | Lewis, II | |
| 2010/0072685 A1 | 3/2010 | Golpe et al. | |
| 2010/0072800 A1 | 3/2010 | Weber et al. | |
| 2010/0102493 A1 | 4/2010 | Deml et al. | |
| 2010/0117428 A1 | 5/2010 | Deml et al. | |
| 2011/0001033 A1 | 1/2011 | Kohl et al. | |
| 2011/0001342 A1 | 1/2011 | Deml et al. | |
| 2011/0022265 A1 | 1/2011 | Sekiya | |
| 2011/0226930 A1 | 9/2011 | Enns et al. | |
| 2011/0278894 A1 | 11/2011 | Lorey | |
| 2012/0025577 A1 | 2/2012 | Kolb | |
| 2012/0043798 A1 | 2/2012 | Haller et al. | |
| 2012/0049421 A1 | 3/2012 | Haller et al. | |
| 2012/0086159 A1 | 4/2012 | Kolb | |
| 2012/0090930 A1 | 4/2012 | Haller | |
| 2012/0091773 A1 | 4/2012 | Lorey | |
| 2012/0126592 A1 | 5/2012 | Kaessner et al. | |
| 2012/0153689 A1 | 6/2012 | Haller et al. | |
| 2012/0153695 A1 | 6/2012 | Haller et al. | |
| 2012/0187615 A1 | 7/2012 | Haller et al. | |

FOREIGN PATENT DOCUMENTS

| | | |
|---|---|---|
| DE | 15 55 056 | 3/1970 |
| DE | 19 16 403 A1 | 10/1970 |
| DE | 2022021 | 11/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 35 17 345 A1 | 11/1986 |
| DE | 3813402 | 11/1989 |
| DE | 38 24 272 A1 | 3/1990 |
| DE | 41 01 221 A1 | 7/1992 |
| DE | 9402417 | 4/1994 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 | 5/2004 |
| DE | 10347219 | 5/2005 |
| DE | 10 2005 028 7 | 1/2006 |
| DE | 10 2006 016 0 | 4/2006 |
| DE | 10 205 003 833 | 6/2006 |
| DE | 10 2005 003 8 | 6/2006 |
| DE | 10 2005 011 8 | 8/2006 |
| DE | 602005001868 | 12/2007 |
| DE | 10 2007 030 4 | 1/2009 |
| DE | 102008040011 | 5/2009 |
| DE | 10 2008 016 6 | 6/2009 |
| DE | 10 2008 010 7 | 8/2009 |
| DE | 10 2008 045 4 | 3/2010 |
| DE | 10 2008 045 492 A1 | 3/2010 |
| DE | 10 2008 052 9 | 4/2010 |
| DE | 10 2008 056 2 | 5/2010 |
| DE | 10 2009 020 0 | 11/2010 |
| DE | 10 2009 040 0 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 2 420 404 | 2/2012 |
| GB | 813165 | 5/1959 |
| GB | 1 166 258 | 10/1969 |
| GB | 1199577 | 7/1970 |
| GB | 1 383 922 | 2/1974 |
| GB | 2 014 522 | 8/1979 |
| JP | 63220026 A | 9/1988 |
| JP | 1237471 A | 9/1989 |
| JP | 09136611 | 5/1997 |
| JP | 2007 062 539 A | 3/2007 |
| SU | 685 528 | 9/1979 |
| WO | WO 2004/110808 | 12/2004 |

OTHER PUBLICATIONS

Office Action for German Patent Application No. 10 2010 048 210.2, mailed Jul. 7, 2011.
Office Action for German Patent Application No. 10 2010 055 342.5, mailed Oct. 6, 2011.
Office Action for German Patent Application No. 10 2010 051 325.3, mailed Oct. 10, 2011.
Extended European Search Report for parallel European Patent Application No. 11 19 5031, mailed Apr. 5, 2012.

(56) References Cited

OTHER PUBLICATIONS

Office Action for German Patent Application No. 10 2010 055 344.1, mailed Oct. 5, 2011.
Examination Report dated Aug. 24, 2012, from the German Patent Office for German Patent Application No. 10 2010 026 569.1.
First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Extended European Search Report for parallel European Patent Application No. 11 19 5039, mailed Apr. 5, 2012.
Examination Report for German Patent Application No. 10 2011 009 530.6 dated May 4, 2012.
Extended European Search Report for European Patent Application No. 12 15 9863, dated Jul. 4, 2012.
Office Action for German Patent Application No. 10 2011 015 364.0, mailed Feb. 6, 2012.
Search Report for European Patent Application No. 11177689.4, mailed Dec. 14, 2011.
Office Action for German Patent Application No. 10 2010 035 888.6 mailed Jun. 9, 2011.
Extended European Search Report corresponding to European Patent Application No. 12151582.9, dated Apr. 17, 2014.
Office Action corresponding to German Patent Application No. 102010045114.2, completed Nov. 8, 2013.
Chinese First Office Action, dated May 30, 2014, in Chinese Patent Application No. 201210018665.6, a related application, 19 pp. (with English translation).
Chinese Second Office Action, dated Dec. 16, 2014, in Chinese Patent Application No. 201210018665.6, a related application, 21 pp. (with English translation).

* cited by examiner

VEHICLE VIBRATION MEANS, VEHICLE SEAT OR PASSENGER CELL OR VEHICLE

CROSS-REFERENCE TO RELATED APPLICATION

This application claims the benefit of priority from German Patent Application No. 10 2011 009 530.6, filed Jan. 26, 2011, which is hereby incorporated by reference in its entirety.

DESCRIPTION

The invention concerns a vehicle vibration device with a horizontal vibration means and with a means for stabilising a horizontal middle position of the horizontal vibration means, in which the horizontal vibration means is arranged horizontally vibratable in the vehicle longitudinal direction and/or the vehicle width direction and in which the stabilisation means comprises a spring element.

The invention furthermore comprises a vehicle seat or a passenger cell or passenger cab of a vehicle.

In particular in vehicle seat guidance systems, it is known to use longitudinal or lateral horizontal springing in order mainly to guarantee improved driving comfort for a vehicle driver in particular when a vehicle is moving on rough ground. In particular on rough ground, a frequent and intensive vibration excitation takes place; for example when crossing a major ground unevenness during which for example a seat part of the vehicle seat guidance system is deflected in the direction of travel. In this context, to reduce the risk that such a vehicle seat guidance system would become critically unstable under a superimposed excitation, as well as the longitudinal or lateral horizontal springing, separate dampers are fitted in the vehicle seat guidance system. This however requires more installation space for the individual components which is often not available or only to an inadequate extent. In addition, the longitudinal or lateral horizontal springing and such dampers must also be connected together functionally with corresponding mechanical systems. This often leads to a complex construction and correspondingly cost-intensive solutions.

The object of the invention is to create a generic vehicle vibration device by means of which the above disadvantages in particular are eliminated.

The object of the invention is achieved by a vehicle vibration device with a horizontal vibration means and an means for stabilising a horizontal middle position of the horizontal vibration means, in which the horizontal vibration means is arranged horizontally vibratable in the vehicle longitudinal direction and/or vehicle width direction, in which the stabilisation means comprises a spring element and in which the stabilisation means is integrated in or on a damper means of the vehicle vibration device.

According to the invention the stabilisation means and the damper means are combined together, whereby the number of components required in the vehicle vibration device can be reduced substantially.

If the stabilisation means is accommodated inside the damper means i.e. integrated inside the damper means, a particularly low-maintenance spring-damper unit can be provided.

If the stabilisation means is mounted outside the damper means i.e. integrated on the damper means, larger spring elements can be provided. To this extent, advantageously even greater masses can be controlled even with a compact spring-damper unit.

Such a stabilisation means can for example also be advantageously arranged outside around a damper as a mechanical spring element so that the damper is arranged inside a constructional volume of the mechanical spring element.

The vehicle vibration device can in the present case have both longitudinal and lateral horizontal springing. To this extent it is advantageous if the vehicle vibration device according to the invention can act both in the vehicle longitudinal direction and in the vehicle lateral direction.

Not only because of the latter case, it is advantageous if the vehicle vibration device comprises more than one damper means.

If in particular the spring elements of two damper means are arranged opposite each other on the vehicle vibration device, a progressive force-travel ratio can be designed constructively simply on the vehicle vibration device.

For this reason it is advantageous if at least two damper means are disposed opposite each other on the vehicle vibration device.

A particularly preferred embodiment provides that the stabilisation means, in particular the spring element of the stabilisation means, is arranged inside a working chamber of the damper means.

As a result the vehicle vibration device can advantageously be fitted very compactly despite the horizontal damping.

If the damper means is arranged substantially horizontally in or to a plane spanned by the vehicle longitudinal direction and vehicle width direction, the present damper means can be integrated extremely flat in the vehicle vibration device.

The object of the invention is achieved also by a method for stabilising a substantially horizontally vibratable horizontal vibration means of a vehicle vibration device in a horizontal middle position, in which a spring unit of a damper means stabilises the substantially horizontally vibratable horizontal vibration means in the middle position.

With the vehicle vibration device according to the invention and the method according to the invention, advantageously a fully equipped spring-damper system can be provided which is perfectly suited to the respective area of application.

The spring unit of the vehicle vibration device according to the invention preferably comprises two spring elements by means of which in particular a piston of a connecting rod of the damper means can be positioned inside a housing of the damper means, pretensioned in a horizontal middle position.

To this extent the object of the invention is also achieved by a use of a spring unit of a damper to stabilise a horizontal vibration means of a vehicle vibration device in a horizontal middle position.

It is particularly advantageous if almost always a standard damper can be used as the present damper means. In this case the damper means can be constructed relatively cheaply, which also has an advantageous influence on the production costs of the vehicle vibration device.

If the damper means comprises a damper without return stroke, with or without separating piston, a particularly comfortable vibration behaviour can be achieved on the horizontal vibration means.

Evidently, alternatively the damper means can also be fitted with a twin tube damper.

The dampers described above which can constitute the damper means are not discussed in more detail here as these are already known from the prior art.

Preferably the horizontal vibration means can vibrate horizontally in relation to a vehicle component mounted stationary on the vehicle vibration device.

With regard to a particularly interesting area of use, it is advantageous if the horizontal vibration means comprises an assembly component of a vehicle seat guidance system or a vehicle cab guidance system.

To this extent in a further aspect of the invention, the present object is also achieved by a vehicle seat or a passenger cell or a vehicle cab of a vehicle characterised by the vehicle vibration device described above.

Further benefits, objectives and properties of the present invention are explained with reference to the enclosed drawing and its description which depict and describe respectively example vehicle vibration devices according to the invention.

Figure 2:
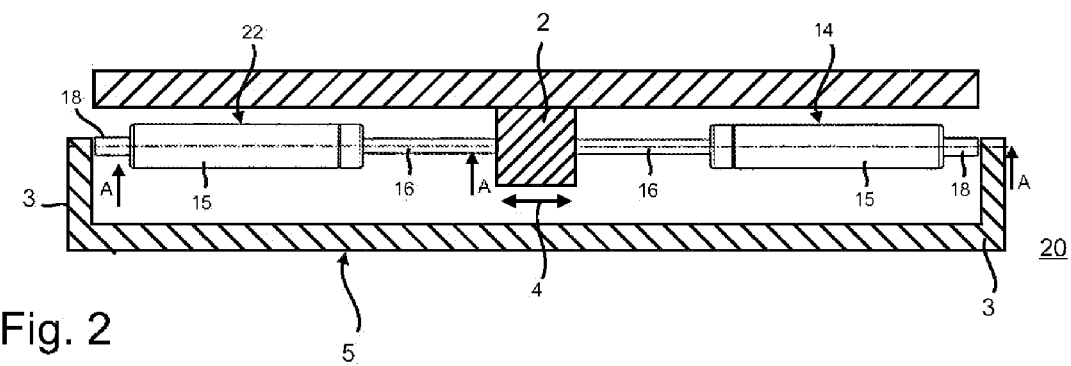
Figure 3:
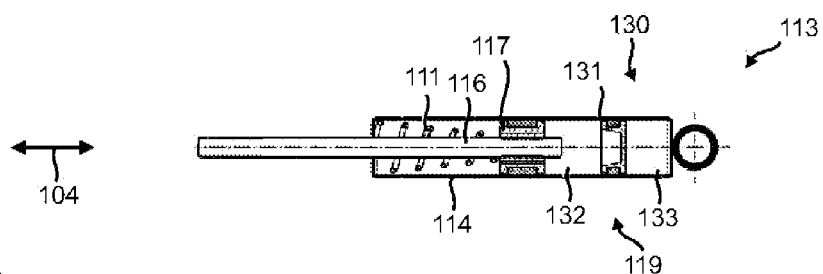
Figure 4:
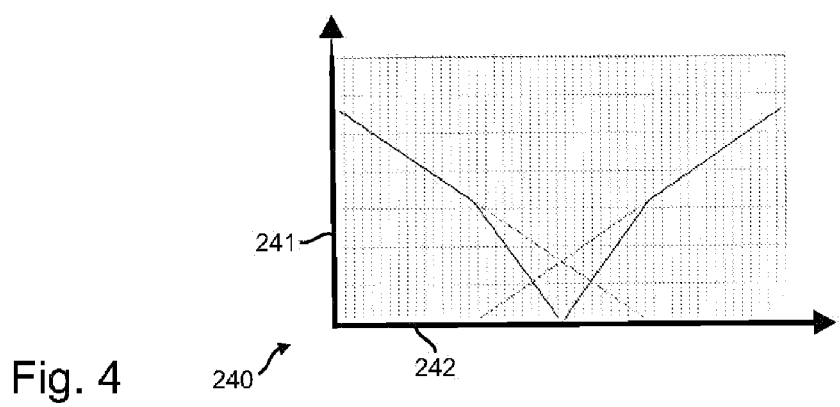
Figure 5:
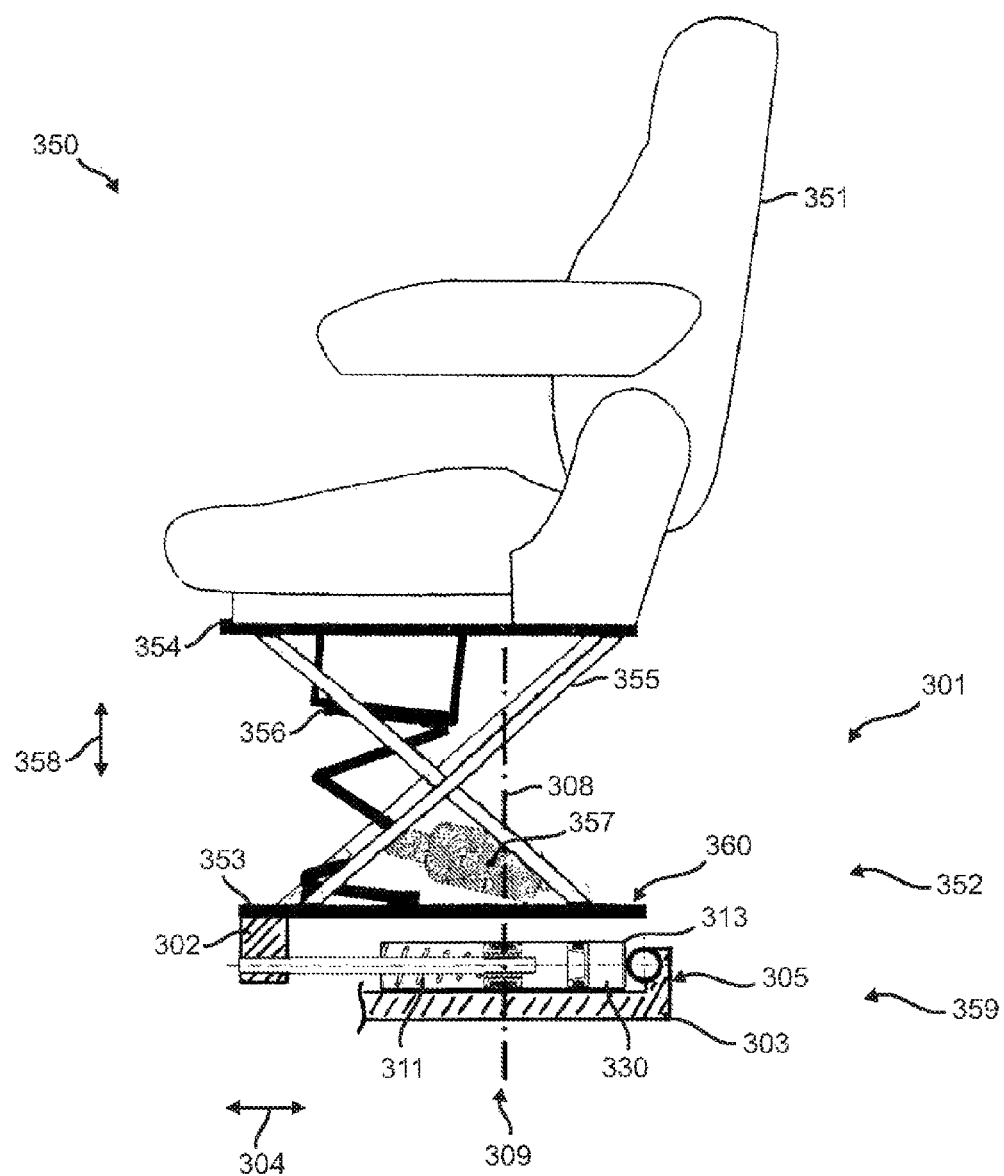

These show:

FIG. 1 schematically a partly cut away view of a vehicle vibration device with damper without return stroke, along a section line A-A of the damper without return stroke shown in FIG. 2;

FIG. 2 schematically a view of the damper shown in FIG. 1 as well as an additional damper positioned in an opposite direction from the first damper;

FIG. 3 schematically a partly cut away view of a damper without return stroke, with a floating separating piston, for an alternative application example in a vehicle vibration device;

FIG. 4 schematically a force-travel diagram of a vehicle vibration device comprising two damper means with two opposing compression springs; and FIG. 5 schematically a view of a first concrete application example of the vehicle vibration device on a vehicle seat.

The vehicle vibration device 1 shown in FIG. 1 has a horizontal vibration means 2 which is mounted horizontally vibratable with a horizontal vibration direction 4 in relation to a vehicle component 3 arranged stationary on the vehicle vibration device 1.

The vehicle component 3 in this embodiment example is a body part 5 of a vehicle not illustrated further here.

The horizontal vibration direction 4 coincides with the vehicle longitudinal direction 6, wherein the arrow tips are oriented pointing towards the vehicle front (not shown here). The vehicle width direction 7 runs correspondingly perpendicular to the plane of the paper.

The horizontal vibration means 2 is mounted through the structure of the vehicle vibration device 1 such that on corresponding vibration excitation it can vibrate horizontally about a horizontal middle position 8. To be able to stabilise the horizontal vibration means 2 in this horizontal middle position 8, the vehicle vibration device 1 has a stabilising means 9 with a spring unit 10 comprising a first spring element 11 and a second spring element 12.

According to the invention the stabilisation means 9 is integrated in a damping means 13 of the vehicle vibration device 1.

The damper means 13 in this embodiment example comprises a conventional oil-hydraulic damper 14 without return stroke, with a housing 15 and a piston rod 16 including piston plate 17, which rod is pretensioned in said housing by the spring elements 11 and 12. To this extent the stabilisation means 9 and damper means 13 can be produced cheaply as standard accessory components. In some embodiments, damper means 13 may be a twin tube damper 21. The solid line in FIG. 1 represents the housing 15 of the single tube damper 14, whereas the dashed line represents the housing of the twin tube damper 21.

The oil-hydraulic damper 14 is attached by its piston rod 16 to the horizontal vibration means 2 and by its housing 15 via a ring joint 18 to the body component 5.

As the stabilisation means 9, in particular the spring elements 11 and 12 of the stabilisation means 9, is advantageously arranged inside a working chamber 19 of the damping means 13 or oil-hydraulic damper 14, a spring-damper unit can be integrated firstly with fewer components and secondly particularly compactly inside the vehicle vibration device 1.

The component reduction however is not merely due to the fact that the stabilisation means 9 is integrated in the damper means 13. Rather it results also from the omission of peripheral mechanical elements, since in particular spring elements and damper elements need no longer be mounted or pivoted separately in a frame construction. As a result additionally a slimmer construction of the vehicle vibration device 1 is achieved.

The damper means 13 in this embodiment example also lies substantially horizontally in a plane spanned by the vehicle longitudinal direction 6 and vehicle width direction 7 so that the vehicle vibration device 1 can be provided particularly flat i.e. with low construction height.

If the horizontal vibration means 2 has been deflected in the horizontal vibration direction 4 such as when driving over a bump in the ground, using the spring forces of the stabilisation means 9 it can be returned to the horizontal middle position 8 and stabilised there. By means of the oil-hydraulic damper 14, the risk of a critical instability of the horizontal vibration means 2 is reduced.

According to the depiction in FIG. 2, the oil-hydraulic damper 14 is again shown in its compact construction from the outside, wherein the inner stabilization means 9 (see FIG. 4) is protected particularly well by the housing 15 against negative influences such as dirt and/or moisture from the environment 20. To the right on the housing 15 can be seen the ring joint 18, while to the left the piston rod 16 protrudes from the housing 15. FIG. 2 also shows a further damper means 22 positioned opposite to oil-hydraulic damper 14.

The further damper means 113 shown in FIG. 3 comprises a conventional oil-gas damper 114 without return stroke, with a gas strut element 130 and a mechanical spring element 111.

The gas strut element 130 and the mechanical spring element 111 in this further embodiment example form a stabilisation means 109 of the damper means 113.

To this extent this further damper means 113 is also suitable for alternative installation in the vehicle vibration device 1 (see FIG. 1).

The working chamber 119 of the oil-gas damper 114 is divided by a floating separating piston 131 into an oil chamber 132 and a gas pressure chamber 133. Because of the gas pressure predominating in the gas pressure chamber 113, the floating separating piston 131 can follow particularly well a piston rod 116 or piston plate 117 of the piston rod 116 which is moved in the horizontal vibration direction 104. Also temperature fluctuations on the damper means 113 can be compensated very well by means of the gas compression strut 130.

As a whole with the damper means 113 shown in FIG. 3, a further improved spring-damping comfort can be achieved on a vehicle vibration device.

Evidently a vehicle vibration device (such as the vehicle vibration device 1 of FIG. 1) can be further modified so that several damper means 13 or 113 can be provided simultaneously and advantageously cooperating on the vehicle vibration device.

The force-travel diagram 240 shown in FIG. 4 contains corresponding characteristic curves in which the abscissa 241 shows values for a travel s in mm and the ordinate 242 shows values for a force in N.

In the first concrete application or installation example shown in FIG. 5, a vehicle seat guidance system 350 of a vehicle seat 351 is fitted with a vehicle vibration device 301 according to the invention.

The vehicle vibration device 301 also has at the top a vertical function part 352 with a base plate 353, a seat plate 354, a scissor frame 355, a coil spring 356, and a damper 357. The vertical function part 352 is responsible for damping vertical vibrations 358 on the vehicle vibration device 301.

At the bottom the vehicle vibration device 301 has a horizontal function part 359 to control vibrations in the horizontal direction 304. In the region of the horizontal function part 359, the vehicle vibration device 301 at the top has a horizontal vibration means 302, at the bottom a vehicle component 303 in the form of a body component 305, and in between a stabilisation means 309 with a mechanical spring element 311 and with a gas strut element 330 to stabilise a horizontal middle position 308, and a damper means 313 in which the stabilisation means 309 is integrated.

In this embodiment example the base plate 353 is part of the horizontal vibration means 302. To this extent the horizontal vibration means 302 comprises an assembly component 360 of the vertical function part 352 of the vehicle seat guidance system 350.

The damper means 313 also has the same structure as the damper means 113 in FIG. 3 so that no further explanation of structure and function is given here.

If we compare the essential components of the vertical function part 352 with those of the horizontal function part 359, it is clearly evident that the latter is constructed substantially slimmer since the stabilisation means 309—in contrast to the separate coil spring 356 and separate damper 357 of the vertical function part 352—is advantageously integrated in the damper means 113. To this extent the number of individual components to be fitted is reduced, whereby advantageously in particular construction space can be saved.

It is evident that the embodiment examples explained above are merely initial embodiments of the vehicle vibration device according to the invention. To this extent the design of the invention is not restricted to the embodiment examples shown.

Certain features disclosed in the application are understood to be novel, including for example, features either individually or in combination with other features as compared with the prior art.

LIST OF REFERENCE NUMERALS

1 Vehicle vibration device
2 Horizontal vibration means
3 Vehicle component
4 Horizontal vibration direction
5 Body component
6 Vehicle longitudinal direction
7 Vehicle width direction
8 Horizontal middle position
9 Stabilisation means
10 Spring unit
11 First spring element
12 Second spring element
13 Damper means
14 Oil-hydraulic damper
15 Housing
16 Piston rod
17 Piston plate
18 Ring joint
19 Working chamber
20 Environment
21 Twin tube damper
22 Further damper means
104 Horizontal vibration direction
109 Stabilisation means
111 Spring element
113 Damper means
114 Oil-gas damper
115 Housing
116 Piston rod
117 Piston plate
118 Ring joint
119 Working chamber
130 Gas strut element
131 Floating separating piston
132 Oil chamber
133 Gas pressure chamber
240 Force-travel diagram
241 Abscissa
242 Ordinate
301 Vehicle vibration device
302 Horizontal vibration means
303 Vehicle component
304 Horizontal vibration direction
305 Body component
308 Horizontal middle position
309 Stabilisation means
311 Mechanical spring element
313 Damper means
330 Gas strut element
350 Vehicle seat guidance system
351 Vehicle seat
352 Vertical function part
353 Base plate
354 Seat plate
355 Scissor frame
356 Coil spring
357 Damper
358 Vertical vibrations
359 Horizontal function part
360 Assembly component

The invention claimed is:

1. Vehicle vibration device comprising a horizontal vibration means and a means to stabilise a horizontal middle position of the horizontal vibration means, in which the horizontal vibration means is arranged horizontally vibratable in the vehicle longitudinal direction and/or in the vehicle width direction, and in which the stabilisation means comprises a spring element, wherein the stabilization means is integrated in or on a damper means of the vehicle vibration device, wherein the horizontal vibration means comprises an assembly component of a vehicle seat guidance system or a vehicle cab guidance system, wherein the assembly component is a base plate, wherein the damper means is rigidly attached by its piston rod in a non-pivotal connection to the horizontal vibration means, and wherein the vehicle vibration device comprises more than one damper means arranged substantially horizontally in or to a plane spanned by the vehicle longitudinal direction and vehicle width diriection.

2. The vehicle vibration device according to claim 1, wherein the stabilization means, in particular the spring element of the stabilisation means, is arranged inside a working chamber of the damper means.

3. The vehicle vibration device according to claim 1, wherein the damper means are disposed opposite each other on the vehicle vibration device.

4. The vehicle vibration device according to claim 1, wherein the damper means comprises a damper without return travel, with or without a separating piston.

5. The vehicle vibration device according to claim 1, wherein the damper means comprises a twin tube damper.

6. The vehicle vibration device according to claim 1, wherein the horizontal vibration means is mounted horizontally vibratable in relation to a vehicle component arranged stationary on the vehicle vibration device.

7. The vehicle seat or passenger cell or vehicle cab of a vehicle, comprising a vehicle vibration device according to claim 1.

8. Method for stabilising a substantially horizontally vibratable horizontal vibration means of a vehicle vibration device in a horizontal middle position, in which a spring unit of a damper means stabilises the substantially horizontally vibratable horizontal vibration means in the horizontal middle position, wherein the horizontal vibration means comprises an assembly component of a vehicle seat guidance system or a vehicle cab guidance system, wherein the assembly component is a base plate, wherein the damper means is rigidly attached by its piston rod in a non-pivotal connection to the horizontal vibration means, and wherein the vehicle vibration device comprises more than one damper means arranged substantially horizontally in or to a plane spanned by the vehicle longitudinal direction and vehicle width direction.

* * * * *